United States Patent
Lee et al.

(10) Patent No.: US 12,373,759 B2
(45) Date of Patent: Jul. 29, 2025

(54) MITIGATING TEMPORAL GENERALIZATION FOR A MACHINE LEARNING MODEL

(71) Applicant: AT&T INTELLECTUAL PROPERTY I, L.P., Atlanta, GA (US)

(72) Inventors: Brandon Bolong Lee, Cupertino, CA (US); Andrew Campbell, Pleasant Hill, CA (US); Ana Armenta, San Jose, CA (US); Prince Paulraj, Coppell, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 172 days.

(21) Appl. No.: 17/839,260

(22) Filed: Jun. 13, 2022

(65) Prior Publication Data
US 2023/0401512 A1  Dec. 14, 2023

(51) Int. Cl.
*G06Q 10/0637* (2023.01)
*G06N 5/025* (2023.01)
*G06N 20/00* (2019.01)

(52) U.S. Cl.
CPC ......... *G06Q 10/0637* (2013.01); *G06N 5/025* (2013.01); *G06N 20/00* (2019.01)

(58) Field of Classification Search
CPC ..... G06Q 10/0637; G06N 5/025; G06N 20/00
See application file for complete search history.

(56) References Cited

U.S. PATENT DOCUMENTS

| | | | |
|---|---|---|---|
| 11,521,270 B2* | 12/2022 | Chiu | G06N 20/00 |
| 2010/0036672 A1* | 2/2010 | Li | G06Q 10/0639 |
| | | | 705/7.11 |
| 2014/0279378 A1* | 9/2014 | Laxmanan | G06Q 40/03 |
| | | | 705/38 |
| 2019/0009133 A1* | 1/2019 | Mettler May | G09B 19/0038 |
| 2019/0369598 A1* | 12/2019 | Kubo | G06N 7/01 |
| 2020/0334570 A1* | 10/2020 | Franklin | G06F 16/904 |
| 2021/0019652 A1* | 1/2021 | Gadelrab | G06F 11/3447 |
| 2021/0184958 A1* | 6/2021 | Kolar | H04L 43/08 |
| 2021/0390420 A1* | 12/2021 | Barnett | G06N 5/02 |
| 2022/0027711 A1* | 1/2022 | Ukil | G06N 3/048 |
| 2022/0076164 A1* | 3/2022 | Conort | G06N 20/00 |
| 2022/0156667 A1* | 5/2022 | Bellenguez | G06Q 10/06375 |

* cited by examiner

*Primary Examiner* — Dylan C White
(74) *Attorney, Agent, or Firm* — Guntin & Gust, PLC; John G Rauch

(57) ABSTRACT

Mitigation of temporal generalization losses a target machine learning model is disclosed. Mitigation can be based on identifying, removing, modifying, transforming, etc., features, explanatory variables, models, etc., that can have an unstable relationship with a target outcome over time. Implementation of a more stable representation can be initiated. Temporal stability measures (TSMs) for one or more model feature(s) can be determined based on one or more variable performance metrics (VPMs). A group of one or more VPMs can be selected based on features of a model in either a development or production environment. Model feature modification can be recommended based on a TSM, which can prune a feature, transform a feature, add a feature, etc. Temporal stability information can be presented, e.g., via a dashboard-type user interface. Models can be updated based on mutations of a model comprising a feature modification(s), including competitive champion/challenger model updating.

20 Claims, 10 Drawing Sheets

MITIGATING TEMPORAL GENERALIZATION FOR A MACHINE LEARNING MODEL

TECHNICAL FIELD

The disclosed subject matter relates to machine learning, and more specifically to technology enabling mitigation of temporal generalization effects corresponding to a machine learning model feature, e.g., an explanatory variable, etc., that can have an unstable relationship with a target outcome over time.

BACKGROUND

A common factor limiting return on investment for conventional machine learning projects can be 'generalization,' which can correspond to an ability of a machine learning model to perform at an acceptable level of performance in a context outside a body of training data, e.g., a machine learning model can perform well in training and then, in a production environment, can suffer from degrading performance. The term 'machine learning model' is generally referred to as 'model' hereinafter, merely for the sake of clarity and brevity. Temporal generalization (TG) can relate to generalization that occurs over time and can be a common challenge in a conventional production environment, for example, in a production environment with dynamic populations, such as, production fraud prevention model, production financial market model, and production multi-touch attribution model. It is not uncommon for model performance to degrade over time, for example, degradation of 50% over the course of several months is not unusual in a conventional production model, which can lead to opportunity loss, increased expense, etc., due to frequent updating of a production model as it ages. Moreover, results of the updating can be obscure prior to conventional upgrading, e.g., the updating of a model can be initiated based on an expectation that the model has aged even where the actual degradation may still not yet be significant enough to justify the cost of the updating. Improved technology to mitigate temporal generalization of a machine model can therefore be desirable.

DETAILED DESCRIPTION

Figure 1:
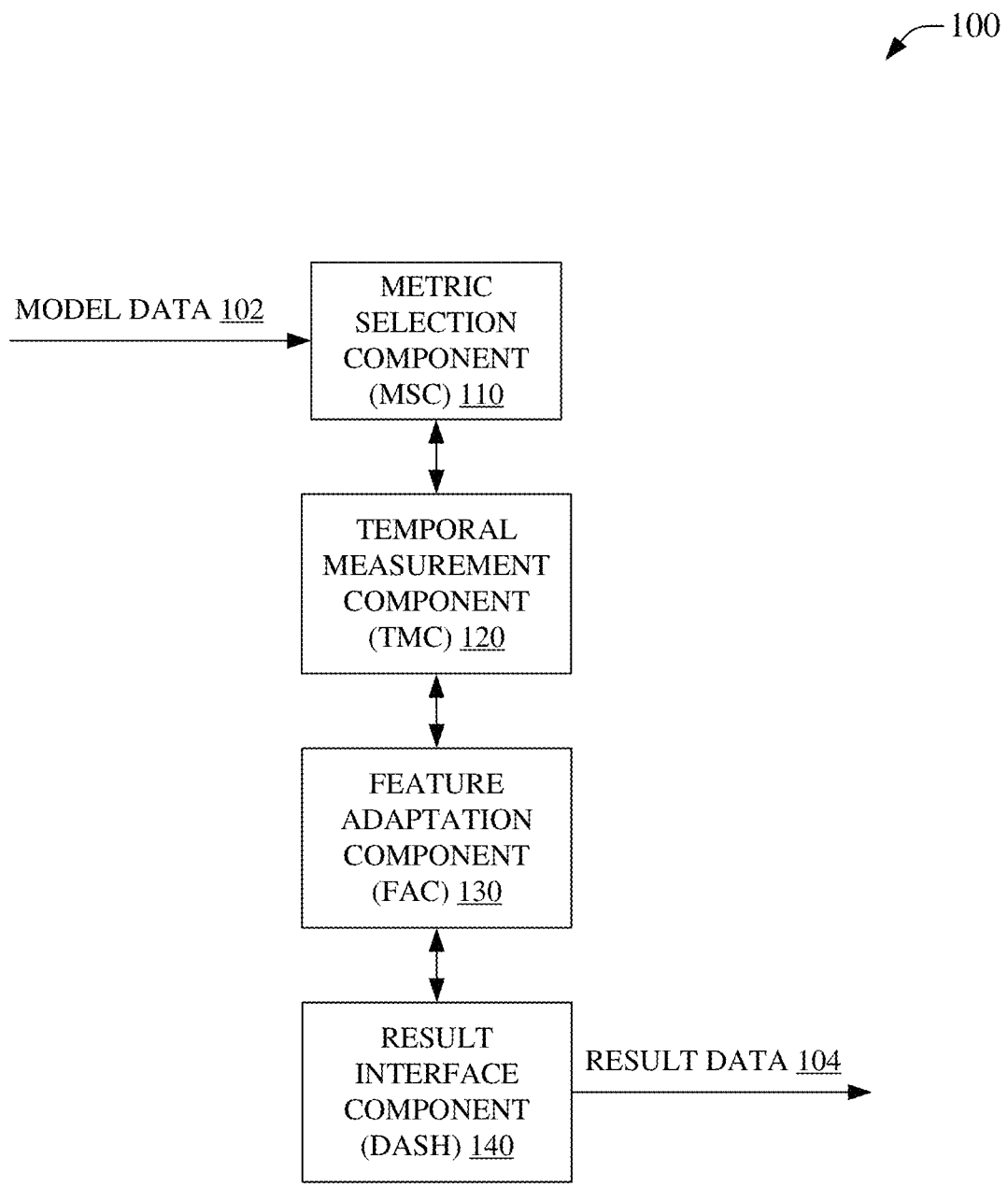
FIG. 1 is an illustration of an example system that can facilitate mitigation of temporal generalization effects corresponding to a machine learning model feature, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional machine learning projects can suffer from 'generalization,' which, as noted herein above, can correspond to an ability of a model to perform at an acceptable level of performance in a context outside a body of training data, e.g., a machine learning model can perform well in training and then, in a production environment, can suffer from degrading performance. Degradation of model performance over time can correspond to temporal generalization (TG), which can be a common challenge in a conventional production environment. As an example of TG, at a first time, a fraud prevention model can be responsive to fraud directed at an elderly population, however, as the perpetrators of the fraud attack shift to target a youthful population at a later second time, the model can fail to perform as well, which can correspond to the model at the second time still being trained to detect fraud vectors directed at the elderly population and not trained to fraud vectors aimed at the example youthful population. It can be common for model performance to degrade over time and to experience TG. Improved technology to mitigate temporal generalization of a machine model can therefore be desirable.

The disclosed subject matter discloses a technology intended to mitigate temporal generalization losses, such as by identifying, removing, modifying, transforming, etc., features, explanatory variables, models, etc., that can have an unstable relationship with a target model outcome over time. As an example, a model performance can be monitored to detect TG, which can cause initiation of a process transforming the model, variables of the model, etc., into a more stable representation, e.g., into an updated model, etc., that can have improved temporal stability and correspondingly mitigate TG effects. Generally, mitigation of temporal generalization can be performed via a Model Generalization Engine (MGE). It is noted that an MGE can comprise other functionality that can address other forms of generalization that are beyond the scope of the instant disclosure and, as such, even though discussion of the MGE herein is generally directed to mitigating TG effects, other functionality of the MGE is not disclaimed either implicitly or explicitly.

Accordingly, an MGE can utilize different variable interaction measures to create both 'fixed-point' statistics to predict a value at a single time, and 'over-time' statistics, to predict a value at another time(s), which can support predicting temporal generalization, for example, a temporal measurement component (TMC) can generate results based on one or more value(s) for one or more variable(s) at one or more point(s) in time, e.g., a group of values that can be termed variable performance metric(s) (VPMs). The results of a TMC can be referred to as a temporal stability measure(s) (TSMs) for one or more model feature, e.g., the TMC can perform an analysis based on VPMs that can reflect temporal stability of one or more of the variables of an input model, which temporal stability data can be comprised in TSMs.

A feature adaptation component (FAC) can generate a permutation(s) of an input model, e.g., adding, removing, transforming, modifying, etc., model features, variables, etc., to facilitate analysis of the permutations(s) in comparison to the input model. In this regard, TSMs can be consumed by a FAC to mutate a model, e.g., typically to generate a more optimized permutation of an input model, etc. As an example, TSMs can indicate a temporally stable first variable and a temporally unstable second variable for an input model. An example FAC can analyze a permutation of the input model that prunes that second variable. The permuted model performance and the input model performance can then be measured to determine if the permutation is an improvement over the input model. A dashboard, e.g., result interface component (dash), can present information based on output from a FAC. This, for example, can result in informing an operator that a model has become stale and can be underperforming, can cause initiation of updating of a production model, can flag a variable comprised in VPMs for further focused study, etc. Generally, an output dashboard, for example, can present a visualization of feature stability statistics, predicted temporal generalization improvements gained from feature pruning/transformation, alternate model(s), etc., in a development environment, a production environment, etc., or combinations thereof.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate mitigation of temporal generalization effects corresponding to a machine learning model feature, in accordance with aspects of the subject disclosure. System 100 can comprise metric selection component (MSC) 110 that can receive data corresponding to a machine learning model, e.g., model data 102, etc. Model data 102 can comprise information relating to inputs to a model, outputs from a model, model parameters, model variables (features), etc. Embodiments of system 100 can be comprised in an MGE, can be an MGE, etc., In embodiments, MSC 110 can determine one or more variable performance metric(s) (VPMs), e.g., a trained VPM extraction model, which is distinct from the model corresponding to model data 102, from can be employed to calculate VPMs. Accordingly, for different input models, e.g., a first input model can correspond to a first model data 102, a second input model can correspond to a second model data 102, etc., MSC 110, e.g., via a trained VPM extraction model, etc., can extract corresponding VPMs, for example, the example first input model can result in first VPMs, the example second input model can result in second VPMs, etc. The VPMs can therefore correspond to features of an input model that can be affected by temporal generalization (TG). As examples of VPMs from MSC 110 based on model data 102, VPMs can be standardized coefficients for regression models, Gini based importance for random forests, etc. MSC 110 can facilitate, via determining a VPM(s), system 100 in selecting a VPM(s) to be employed in variable interactions and importance based on an inputted model and a selected output metric(s). In embodiments, system can select a best group of VPMs for variable interactions and importance for the inputted model and output the metric choices.

System 100 can further comprise temporal measurement component (TMC) 120 that can receive information from MSC 110, e.g., VPMs, model data 102, etc., to facilitate analysis of VPMs in relation to temporal stability. The calculations can be employed to determine stability between a feature and an output, e.g., a stability of a feature-target relationship, over time. A feature-target relationship stability can be referred to as a temporal stability measurement (TSM). TMC 120 can generate one or more TSMs, e.g., a group of VPMs can correspond to a group of TSMs. It is noted that in this example, the count of VPM in the VPMs can be the as or different than the count of TSM in the TSMs, e.g., there can be more VPMs that TSMs, there can be more TSMs than VPMs, or there can be an equal count of VPMs and TSMs. Generally, a TSM can indicate how significant an impact a VPM is expected to have on a model over time, e.g., a TSM will typically include a variety of indicators for feature impact across time for an input model.

Output from TMC 120, e.g., TSMs, model data 102, VPMs, etc., can be consumed by feature adaptation component (FAC) 130 of system 100. FAC 130 can determine permutations of an input model, e.g., corresponding to model data 102, typically based on one or more TSM. In this regard, a mutated model can prune a feature, add a feature, modify a feature, etc., or combinations thereof, based on analysis of a TSM generally predicated on a VPM for the example input model being mutated by FAC 130. As an example, an input model can have a first feature that can be highly susceptible to aging, e.g., becoming less relevant over time at properly predicting a result based on the feature, this feature can be identified as one of many VPMs via MSC 110, determined to be of significance at TMC 120 resulting in an indication of prominence in a group of TSMs, which can cause FAC 130 to generate a permutation of the input model that does not include the first feature based on the first feature corresponding to an elevated temporal effect. Analysis of the example model permutation can indicate that exclusion of the example first feature can cause the mutated model to be more temporally stable than the input model. This can then be leveraged to update the input model, flag the first feature for further study, alert production users of the input model of the temporal sensitivity of the first feature, etc. In contrast to conventional systems that may only look at the temporal stability of an entire model, rather than analyzing a temporal sensitivity of features of a model and changes to performance for permutations of the model based on feature TG effects, the disclosed subject matter can represent a substantial improvement over conventional systems.

System 100 can comprise result interface component (DASH) 140 that can present result data 104, etc., e.g., dash 140 can be a dashboard enabling user interactions with system 100 that can include presenting a user with results from FAC 130, TMC 120, MSC 110, model data 102, etc., can enable selection of permutation schema, can facilitate automated updating of models in development and/or production environments, can facilitate designation of a subsequent analysis, etc., among many dashboard-type interactions with a system described herein, e.g., system 100, 200, . . . , etc.

In an embodiment, TMC 120 output can resemble a statistical model training set. In this regard, for example, there can be one row for each feature, e.g., corresponding to a VPM, and one column for each TSM. In this example, the standardized representation can enable FAC 130 to process any feature, regardless of a data type of that feature in the input model corresponding to model data 102. TSMs can be, generally, designed and formatted from raw VPMs, such that in various embodiments, TSMs can typically be used as inputs for the FAC 130. Accordingly, the TSMs can be transformed into suitable machine learning features, or other metrics, which can be properly consumed by FAC 130.

In an example, SHAP features can be extracted as SHAP VPMs, where SHAP is an open-source library that explains model outputs using a combination of additive feature attribution and approximation methods. The example SHAP VPMs can be converted into usable TSMs, however the TSMs produced may be hard to interpret. Heuristic calculation can enable the use of SHAP feature values to be used in analyzing model performance over time. This calculation can be important for features that can see a change in impact as a model ages but are not apparent when analyzing the complete dataset. As such, a calculation for the SHAP values, as SHAP VPMs, can be used to find, for example, a standard deviation of average SHAP values for each feature over-time. These resulting values can be treated as the TSMs for each feature, e.g., the conversion of SHAP VPMs can be identified at MSC 110 and analyzed at TMC 120 to generate the example TSMs. Result data 104 can therefore comprise the TSMs that can correspond to the SHAP feature values but be more easily human-interpreted. In this regard, DASH 140 can be regarded as consolidating a complex algorithm into simpler explanatory values to aid a user with comprehension of temporal generalization effects for an input model, a feature also not found in other conventional systems.

In another example, hyper-parameter tuning can also be accomplished via system 100. In this example, a model can be trained on a sliding window of different time periods. VPMs can be identified for the example sliding window(s) at MSC 110. TSMs can be calculated by TMC 120 from analysis of VPMs, for example, VPM coefficients, VPM Gini importance values, etc., across the example sliding window of different time periods. The resulting TSMs can indicate feature-target relationship temporal stability over time, e.g., based on the stability of the values of the VPMs over the sliding window of different time periods. It is noted that in addition to this and the above example, there may be one or more other approaches to generating TSMs, which will preferably all be extensible with a standardized API to enable end users to implement custom performance metrics, and all such other approaches are to be considered within the scope of the instant disclosure even where they are not explicitly recited for the sake of clarity and brevity.

Figure 2:
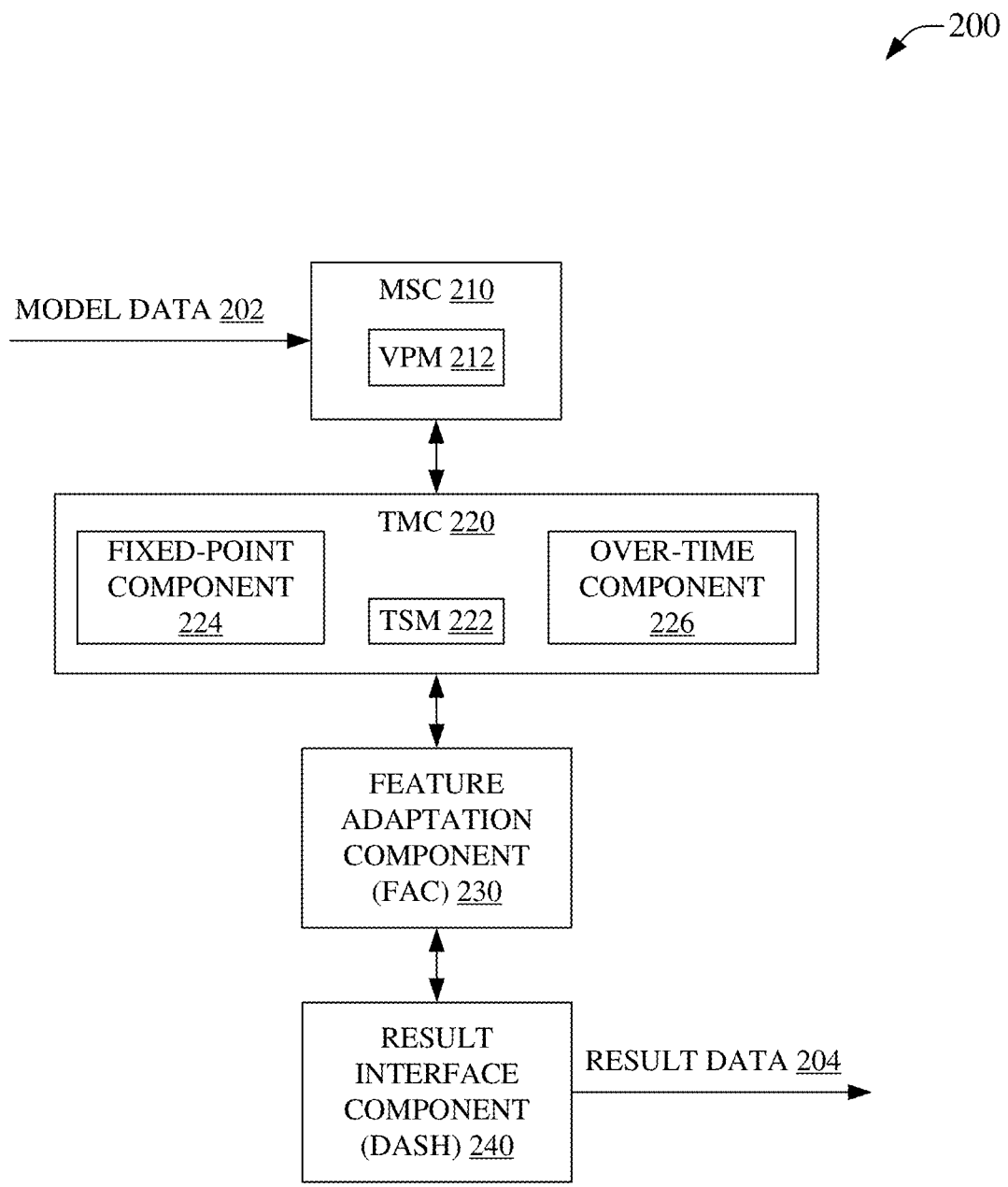
FIG. 2 is an illustration of an example system that can facilitate mitigation of temporal generalization (TG) effects based on a temporal stability measure(s) (TSMs) determined from a selected variable performance metric(s) (VPMs), in accordance with aspects of the subject disclosure.

FIG. 2 is an illustration of a system 200, which can enable mitigation of temporal generalization effects based on a temporal stability measure(s) determined from a selected variable performance metric(s), in accordance with aspects of the subject disclosure. System 200 can comprise MSC 210 that can receive data corresponding to a machine learning model, e.g., model data 202, etc. Model data 202 can comprise information relating to inputs to a model, outputs from a model, model parameters, model variables (features), etc. As was also noted for system 100, embodiments of system 200 can be comprised in an MGE, can be an MGE, etc.

In embodiments, MSC 210 can determine one or more VPM 212. In embodiments, different input models can correspond to different model data 202 that can then result in different groups of VPMs being determined by MSC 210, e.g., first model data can result in first VPM, second model data can result in second VPM, etc. These example VPMs can therefore correspond to features of a corresponding input model.

System 200 can further comprise TMC 220 that can receive information, e.g., VPMs, model data 202, etc., from MSC 210 that can facilitate analysis of VPMs in relation to temporal stability, e.g., analysis of how a VPM's value can change over time and the corresponding effect on predictions of the input model. Calculations can be regarded as quantifying stability between a feature and an output over time, e.g., temporal stability measurement (TSM) 222. TSM 222 can be determined by TMC 220, in an embodiments, based on both fixed-point and over-time data calculations. Generally, a TSM can indicate how significant an impact a VPM is expected to have on a model over time, e.g., a TSM will typically include a variety of indicators for feature impact across time for an input model. Accordingly, TMC 220 can comprise fixed point component 224 and over time component 226 that can correspondingly perform fixed time calculations and over-time calculations based on VPM 212 to determine TSM 222. As an example, a model output can be determined for relationship to a first value of a feature of the model for a fixed point in time by fixed point component 224. Similarly, in an example, a change in a model output can be determined for a given relationship to a first value of a feature of the model for a time window, e.g., over a time period, by over time component 226. In accord with these examples, a value of the model output at a given time and a measurement of a change in the model output over a time period can be determined for a feature of the model. It is noted that the change in the model output can have a determined mathematical relationship to a change in the value of the feature corresponding to the time window. As an example, at time T1 the output can be 6 for an input of 3 and at time T2 the output can be 8 for an output of 6 as can be determined in this example by fixed point component 224. Continuing the example, over time component 226 can determine that the feature had a correlation of 0.994 between time T0 and T1 and a correlation of 0.89 between time T1 and T2. These determinations from fixed point component 224 and over time component 226 can be embodied in a TSM corresponding to a feature, e.g., in the example, the value at T2 can be equal to 1.5 times the feature value, but can be observed to have a lower correlation value than in the previous period, which can indicate that the feature is less of an predictor of the output value than in previous periods.

Accordingly, a permutation of the model can be generated that excludes this less impactful input feature despite still being able to determine an output value at a fixed point in time based on the input feature value.

An output from TMC 220, e.g., TSM 222, fixed point component 224 calculations, over time component 226 calculations, model data 202, VPM 212, etc., can be consumed by FAC 230. FAC 230 can determine permutations of an input model, e.g., corresponding to model data 202, typically based on one or more TSM 220. In this regard, a mutated model can prune a feature, add a feature, modify a feature, etc., or combinations thereof, based on analysis of TSM 220 that can be predicated on VPM 212. As an example, an input model can have a first feature that can be highly susceptible to aging and this feature can be identified as VPM 212 via MSC 210, determined to be of significance at TMC 220 such that TSM 222 can correspond to, and indicate temporal stability of, VPM 212. FAC 230, based on TSM 220, etc., can generate a permutation of the input model that, for example, does not include the first feature based on the first feature corresponding to an elevated temporal effect. Analysis of the example model permutation can indicate that exclusion of the example first feature can cause the mutated model to be more temporally stable than the input model. This can then be leveraged to update the input model, flag the first feature for further study, alert production users of the input model of the temporal sensitivity of the first feature, etc.

System 200 can comprise DASH 240 that can present result data 204, etc. DASH 240 can be the same as, or similar to, DASH 140, e.g., a dashboard enabling user interactions with system 200 that can include presenting a user with results from FAC 230, TMC 220, fixed point component 224 calculations, over time component 226 calculations, MSC 210, VPM 212, model data 202, etc., can enable selection of permutation schema, can facilitate automated updating of models in development and/or production environments, can facilitate designation of a subsequent analysis, etc., among many dashboard-type interactions with a system described herein, e.g., system 100, 200, . . . , etc.

Figure 3:
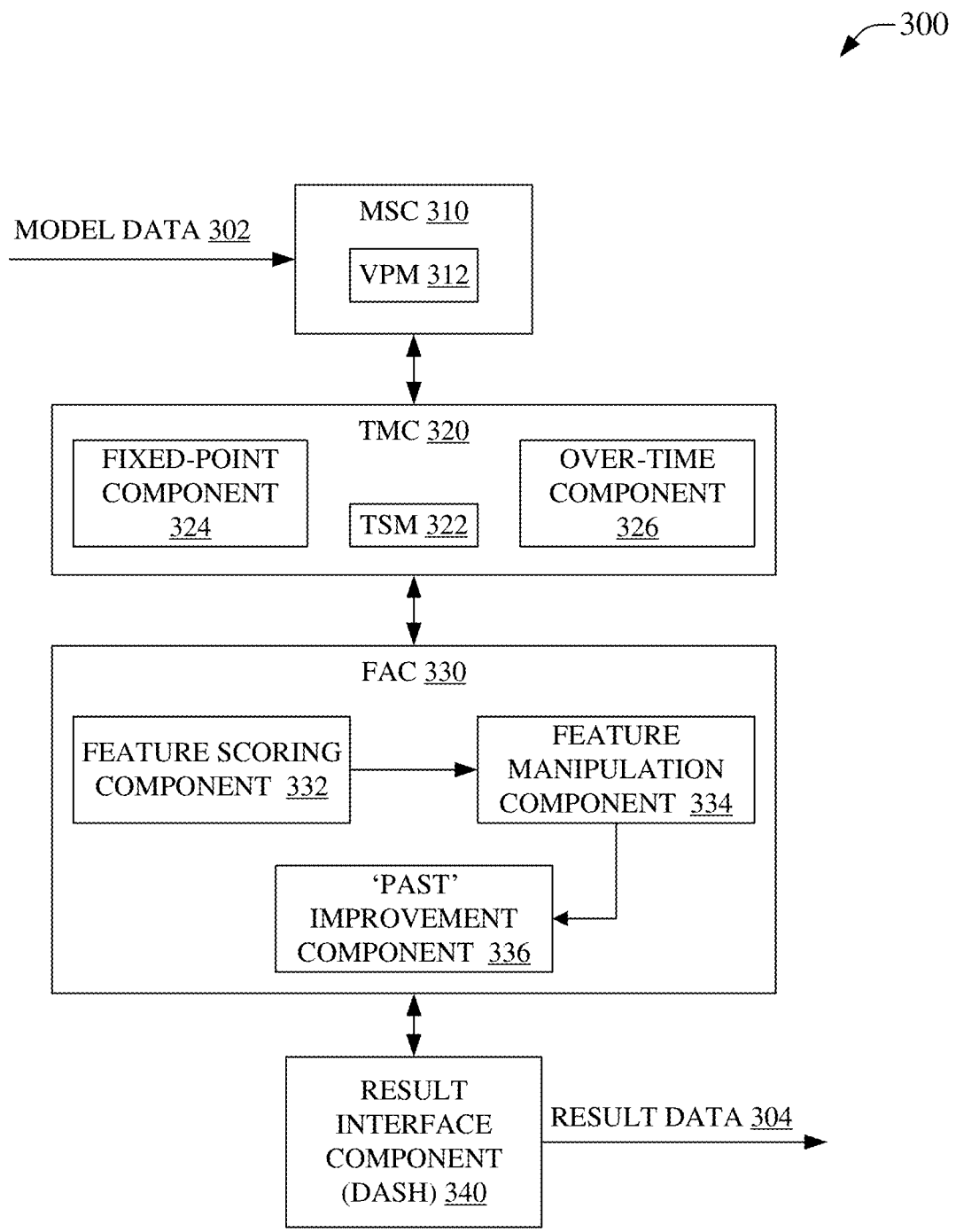
FIG. 3 is an illustration of an example system that can enable mitigation of temporal generalization effects via a model improvement based on TSMs for VPMs, in accordance with aspects of the subject disclosure.

FIG. 3 is an illustration of a system 300, which can facilitate mitigation of temporal generalization effects via a model improvement based on TSMs for VPMs, in accordance with aspects of the subject disclosure. System 300 can comprise MSC 310 that can receive data corresponding to a machine learning model, e.g., model data 302, etc. Model data 302 can comprise information relating to inputs to a model, outputs from a model, model parameters, model variables (features), etc. As was also noted for systems 100, 200, . . . , etc., embodiments of system 300 can be comprised in an MGE, can be an MGE, etc. In embodiments, MSC 310 can determine one or more VPM 312. In embodiments, different input models can correspond to different model data 302 that can then result in different groups of VPMs being determined by MSC 310, e.g., first model data can result in first VPM, second model data can result in second VPM, etc. These example VPMs can therefore correspond to features of a corresponding input model.

System 300 can further comprise TMC 320 that can receive information, e.g., VPMs, model data 302, etc., from MSC 310 that can facilitate analysis of VPMs in relation to temporal stability, e.g., analysis of how a VPM's value can change over time and the corresponding effect on predictions from the input model. Calculations can be regarded as quantifying stability between a feature and an output over time, e.g., temporal stability measurement (TSM) 322. TSM 322 can be determined by TMC 320, in embodiments, based on both fixed-point calculations, e.g., via fixed point component 324, and over-time data calculations, e.g., via over time component 326. Generally, a TSM can indicate how significant an impact a VPM is expected to have on a model over time, e.g., a TSM will typically include a variety of indicators for feature impact across time for an input model.

An output from TMC 320, e.g., TSM 322, fixed point component 324 calculations, over time component 326 calculations, model data 302, VPM 312, etc., can be consumed by FAC 330. FAC 330 can utilizes TSM 322 to rank a feature corresponding to VPM 312, for example ranking several features of an input model, which can correspond to VPMs used to determine TSMs, by a most impactful feature according to a selected ranking algorithm, rule, filter, etc. Accordingly, feature scoring component 322 can enable identification of features, for example, according to a ranking by feature impact, which can be expected to most change a models temporal generalization via a modification to the feature, removal of the feature from the model, weighting of the feature value, addition of a new counter feature to the model, etc.

FAC 330 can further comprise feature manipulation component 334 that can receive feature scoring information from feature scoring component 332. Feature manipulation component 334 can evaluate feature modification/transformation, feature removal, new feature addition, etc. In regard to feature removal, TSM 322, e.g., generated by the TMC 320, can be employed to ranking features, for example by most negative impact, etc., via feature scoring component 332, and feature manipulation component 334 can evaluate model permutations removing a lowest ranking feature(s). This can generate mutated model outputs that can aid in the discovery of features having low impact on a model's predictions, e.g., an end user can quickly discover if there are redundant features, features that can be dropped to improve the model, etc. Similarly, in regard to feature alternation, modification, transformation, etc., modification methods can be applied to one or more TSM 322, and the modified one or more TSM 322 can be embodied in a mutated input model to evaluate the effect of the TSM modification. As an example, a modification method can include dynamically applying a weight(s) to one or more features. As will be appreciated by one of skill in the art, numerous modification 'recipes' can be implemented to mutate features of one or more input model permutations and all such recipes are considered within the scope of the instant disclosure even where not enumerated, recited, etc., for the sake of clarity and brevity. Modification can comprise, for example, when applied to categorical variables, numerical target encoding, cardinality reduction, etc. Feature manipulation component 334 can generate an extensive group of input model permutations, e.g., one or more permutation systematically adding a variable/feature, pruning a variable/feature, causing one or more modifications of a variable/feature, etc., or combinations thereof. The order in which the indicated permutations are generated can be predicated on feature scores, e.g., expected impact of adding, pruning, modifying, etc., a feature, as determined at feature scoring component 332, e.g., model permutations affecting more impactful features can be determined ahead of permutations affecting less impactful features, etc.

The permutations of the input model generated can be evaluated via 'PAST" improvement component (PASTC) 336. In embodiments of system 300, PASTC 336 can facilitate calculation of a new objective function for model training that, for example, can maximize the tradeoff between target metric performance and variability over time.

In this regard, a model can perform well for a single target training set, but over time as data changes, the model can drop in performance. In some embodiments, PASTC 336 can implement a function that can optimize toward a model with improved performance and stability over time (PAST) across multiple iterations, for example, using tools like genetic algorithms, simulated annealing, etc. PASTC 336 can output a new model with features along with the TSMs and a PAST objective function value that improve over the input model corresponding to model data 302. In this regard, the results of feature manipulation component 334 can be evaluated to select a preferred model permutation that can provide a best fit with a one or more selected business goals, corresponding rules, selection algorithms, or combinations thereof. In this regard, FAC 330 can determine permutations of an input model, e.g., corresponding to model data 302, typically based on one or more TSM 320. A mutated model can prune a feature, add a feature, modify a feature, etc., or combinations thereof, based on analysis of TSM 320 that can be predicated on VPM 312, e.g., via ranking, feature manipulation, and PAST evaluation as disclosed.

System 300 can again comprise DASH 340 that can present result data 304, etc. DASH 340 can be the same as, or similar to, DASH 140, 240, etc., e.g., a dashboard enabling user interactions with system 300 that can include presenting a user with results from FAC 330, feature scoring component 332 results, feature manipulation component 334 results, PAST improvement component 336 results, TMC 320, fixed point component 324 calculations, over time component 326 calculations, MSC 310, VPM 312, model data 302, etc., can enable selection of permutation schema, can facilitate automated updating of models in development and/or production environments, can facilitate designation of a subsequent analysis, etc., among many dashboard-type interactions with a system described herein, e.g., system 100, 200, 300, . . . , etc.

Figure 4:
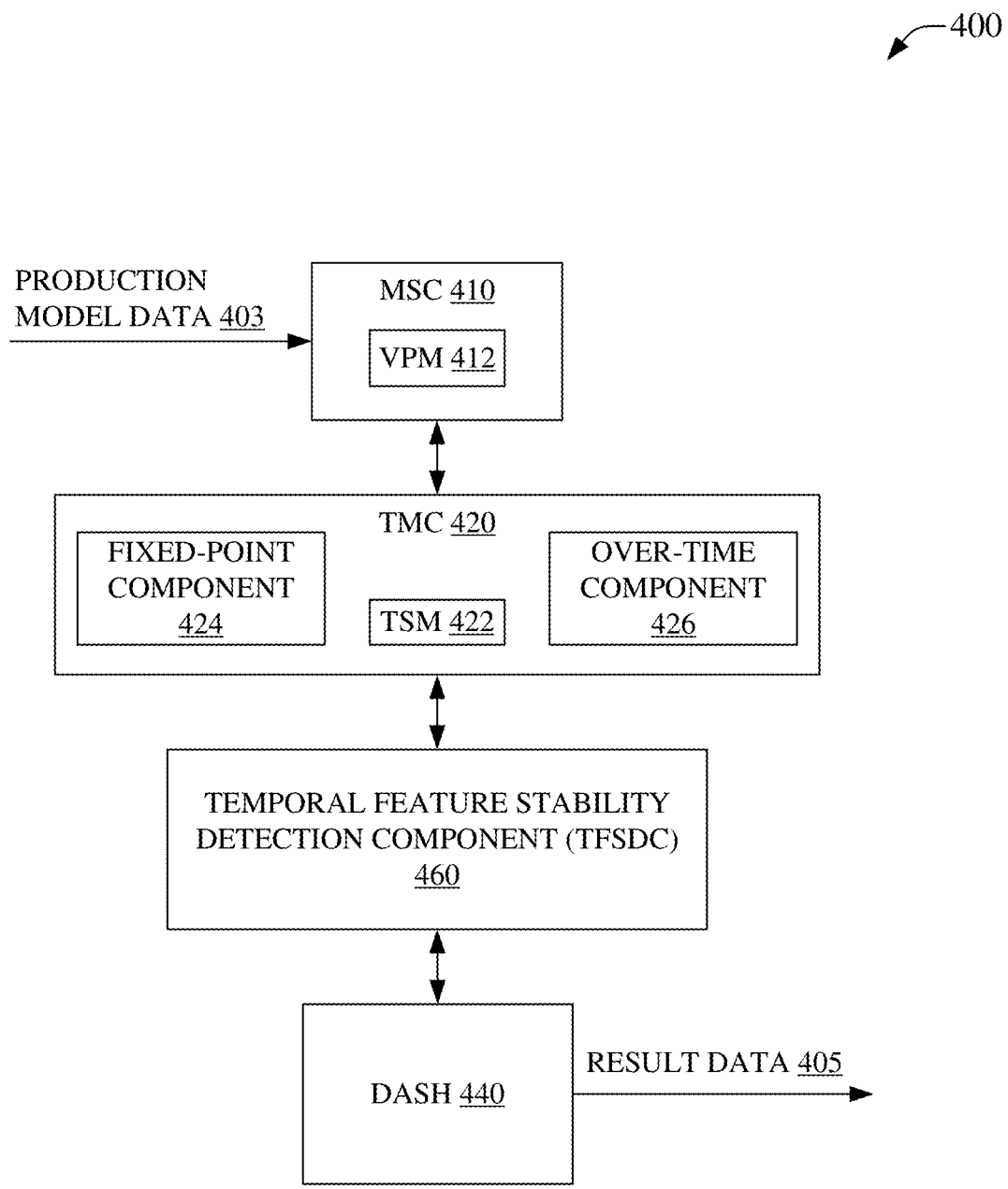
FIG. 4 illustrates an example system that can facilitate mitigation of temporal generalization effects in a production environment via TG monitoring of a production model in use, in accordance with aspects of the subject disclosure.

FIG. 4 is an illustration of a system 400, which can enable mitigation of temporal generalization effects in a production environment via TG monitoring of a production model in use, in accordance with aspects of the subject disclosure. System 400 can comprise MSC 410 that can receive data corresponding to a machine learning model deployed in a production environment, e.g., production model data 402, etc. Production model data 402, hereinafter model data 402 for simplicity, can comprise information relating to inputs to a model in a production environment, outputs from a model in a production environment, production environment model parameters, production environment model variables (features), etc. As was also noted for systems 100, 200, 300, . . . , etc., embodiments of system 400 can be comprised in an MGE, can be an MGE, etc. In embodiments, MSC 410 can determine one or more VPM 412 corresponding to one or more features of a model in a production environment. A model in a production environment can be contrasted to a model in a development environment, training environment, etc. In this regard, as compared to selecting a best training model with regard to temporal stability, etc., system 400 can facilitate monitoring of a deployed trained model, which, for example, can aid in detecting when performance of the trained model has changed, quantification of any performance change, identification of significant features corresponding to a performance change for a trained model in a production environment, etc.

System 400 can comprise TMC 420 that can receive information, e.g., VPMs, model data 402, etc., from MSC 410 that can facilitate analysis of VPMs in relation to temporal stability in a production environment, e.g., analysis of how a VPM's value can change over time and the corresponding effect on predictions from the input model in the production environment. Calculations can be regarded as quantifying stability between a feature and an output over time, e.g., temporal stability measurement (TSM) 422 in a production environment. TSM 422 can be determined by TMC 420, in embodiments, based on both fixed-point calculations, e.g., via fixed point component 424, and over-time data calculations, e.g., via over time component 426, all again in a production environment. Generally, a TSM can indicate how significant an impact a VPM is expected to have on a model over time, e.g., a TSM will typically include a variety of indicators for feature impact in a production environment across time for an input model in the production environment.

An output from TMC 420, e.g., TSM 422, fixed point component 424 calculations, over time component 426 calculations, model data 402, VPM 412, etc., can be consumed by temporal feature stability detection component (TFSDC) 460. TFSDC 460 can monitor a model in production to detect when temporal generalization is degrading, failing, etc. Conventional systems and tools do not measure stability of a relationship between a feature and a target, e.g., feature-target stability, over time. However, monitoring a system, e.g., a model in a production environment, can set an alert, flag, notification, trigger a response, etc., to a feature-target relationship with a sufficiently degraded stability, e.g., according to a TG degradation rule, filter, ranking, algorithm, etc. Determination of degradation of TSMs can generally be regarded as an improvement over conventional extant feature drift detection systems that typically merely identify when a distribution of an explanatory variable has drifted from a training benchmark value. In this regard, it is noted that feature drift alone does not guarantee a drop in model performance, but a degradation of feature-target stability typically does guarantee a drop in model performance. As an example, a high fraud rate in NEW orders can correspond to an increase in an amount of fraud predictions where a percent of NEW orders also increases. However, as long as NEW orders is a still a high-risk channel, this increase in fraud predictions can be regarded as being appropriate. In contrast, a conventional system would alert at the increased in fraud predictions despite the increase being readily appreciated as being appropriate. However, disclosed TFSDC 460 can, in contrast, not alert merely due to the increased fraud predictions, but rather in response to the NEW orders being determined to no longer be a high-risk channel, e.g., in response to the feature-target stability degrading such that NEW orders are no longer a good indicator of a high fraud rate.

In embodiments, both VPMs and TSMs can be employed to measure the stability of a model in a production environment, e.g., TFSDC 460 can monitor stability to allow system 400 to alert for feature-target instability over a period of time. TFSDC 460 analysis of one or more TSM 422 can be contrasted with conventional techniques such as LIME plots, etc., to analyze fixed-point production. As such, TFSDC 460 can analyze TSMs over a set of production data across time. These values can then be used in heuristic, statistical, or machine learning algorithms to alert about certain features, e.g., features that need to be repaired/modified, have degraded and should be pruned, can be countered with a newly added feature, etc. Furthermore, data collected from system 400 can be used within a FAC, for example similar to or the same as FAC 130, 230, 330, etc., to further target certain features by mutating the production model, analysis of the permutations, and selection of a preferred updated model that can be implemented to replace a current production model suffering from temporal generalization effects.

System 400 can also comprise DASH 440 that can present result data 404, etc. DASH 440 can be the same as, or similar to, DASH 140, 240, 340, etc., e.g., a dashboard enabling user interactions with system 400 that can include presenting a user with results from a FAC, feature scoring component results, feature manipulation component results, PAST improvement component results, TFSDC 460 results, TMC 420, fixed point component 424 calculations, over time component 426 calculations, MSC 410, VPM 412, model data 402, etc., can enable selection of permutation schema, can facilitate automated updating of models in development and/or production environments, can facilitate designation of a subsequent analysis, etc., among many dashboard-type interactions with a system described herein, e.g., system 100, 200, 300, 400, . . . , etc.

Figure 5:
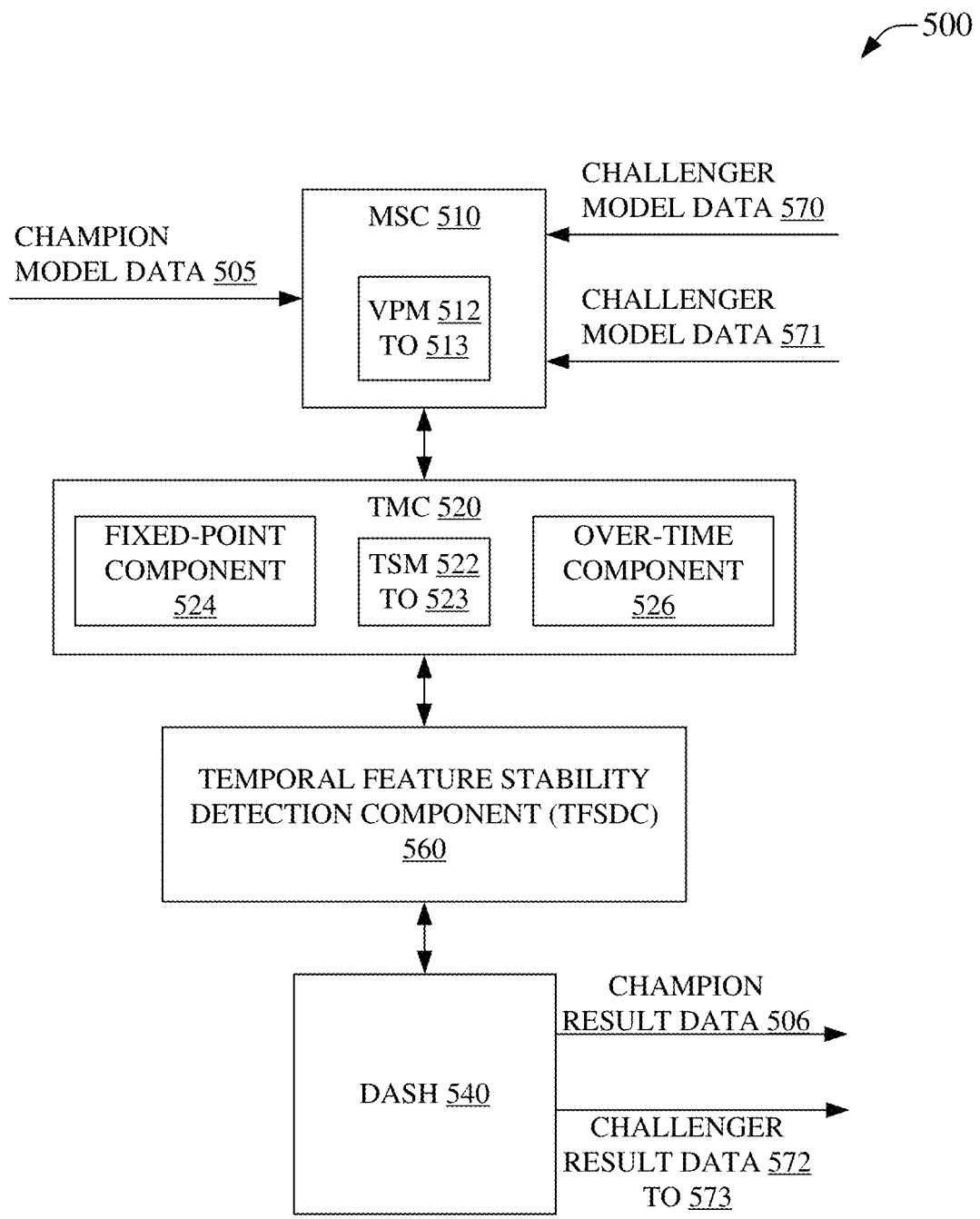
FIG. 5 illustrates an example system that can facilitate mitigation of temporal generalization effects via a competitive model improvement process comparing a champion model with one or more challenger model(s) leveraging TSMs based on VPMs, in accordance with aspects of the subject disclosure.

FIG. 5 is an illustration of a system 500, which can support mitigation of temporal generalization effects via a competitive model improvement process comparing a champion model with one or more challenger model(s) leveraging TSMs based on VPMs, in accordance with aspects of the subject disclosure. System 500 can comprise MSC 510 that can receive data corresponding to a first machine learning model, which can be a current preferred model, such as a deployed production environment model, etc., e.g., champion model data 505, etc. Champion model data 505, e.g., from a current preferred machine learning model, hereinafter model data 505 for simplicity, can comprise information relating to inputs to a model, outputs from a model, model parameters, model variables (features), etc. MSC 510 can similarly receive model data from one or more other models, which can be referred to as challenger models, e.g., as challenger model data 570, 571, etc., hereinafter model data 570, 571, etc., correspondingly for simplicity. Challenger model data can comprise information relating to inputs to a model other than the champion model, outputs from a model other than the champion model, model parameters from a model other than the champion model, model variables (features) from a model other than the champion model, etc. System 500 can support comparison between a champion model and one or more other challenger models via the illustrated structure. As was previously noted for systems 100, 200, 300, 400, . . . , etc., embodiments of system 500 can be comprised in an MGE, can be an MGE, etc.

Embodiments of system 500 can determine one or more VPM via MSC 510. The VPMs determined via MSC 510, e.g., VPM 512 to 513, etc., can corresponding to model data from the champion model and the one or more challenger models, e.g., model data 505, 570, 571, etc., to facilitate the comparison of the different models corresponding to data received via MSC 510. As an example, a model in a production environment can be a preferred model, e.g., a champion model, and can be contrasted to an alternate model, e.g., a model of the one or more challenger models. This can enable system 500 to facilitate analysis of the champion and challenger(s) for comparison. Accordingly, system 500 can comprise TMC 520 that can receive information, e.g., VPM 512-513, etc., model data 505, 570, 571, etc., or other data from MSC 510 that can facilitate analysis of VPMs in relation to temporal stability and model performance. As such, one or more challenger models can be evaluated against a champion model, and other challenger models, on both expected predictive performance but also on expected temporal stability, as disclosed at length elsewhere herein. Calculations can be regarded as quantifying stability between a feature and an output over time for a given model, e.g., one or more temporal stability measurement (TSM) for a given model. TSM 522 to 523, etc., can therefore correspond to VPM 512 to 513, etc., which can also correspond to model data 505, 5702, 571, etc. TSM 522-523, etc., in embodiments, can be based on both fixed-point calculations, e.g., via fixed point component 524, and over-time data calculations, e.g., via over time component 526, similarly to, or the same as, has been presented in regard to other TMCs, e.g., 120, 220, 320, 420, etc. Generally, a TSM can indicate how significant an impact a VPM is expected to have on a given model over time, e.g., a TSM will typically include a variety of indicators for feature impact in a production environment across time for an input model in the production environment. As such, when system 500 is present with a champion and one or more challenger models, TSM can similarly indicate, per model data group, e.g., each of model data 505, 570, 571, etc., how significant an impact a corresponding VPM is expected to have on that specific model over time, e.g., a champion VPM can impact that champion model output, while a challenger VPM can impact that challenger model output.

An output from TMC 520, e.g., TSM 522 to 523, etc., corresponding fixed-point component 524 calculations, corresponding over time component 526 calculations, model data 505, 570, 571, etc., VPM 512 to 523, etc., or other TMC 520 output, can be consumed by temporal feature stability detection component (TFSDC) 560. TFSDC 560 can monitor the champion model and one or more challenger models to determine which model has preferred temporal generalization performance, which model has preferred predictive performance, etc. As previously noted, conventional systems and tools do not measure stability of a relationship between a feature and a target, e.g., feature-target stability, over time. As such, they also do not perform this functionality for a plurality of models, e.g., a champion model and one or more challenger models, to enable comparison of the several models via a system, such as system 500. Comparative monitoring of the plurality of models by system 500 can enable TFSDC 560 to set an alert, flag, notification, trigger a response, etc., to a feature-target relationship of the one or more model data 505, 570, 571, etc., based on determining degraded TSM/VPM stability, e.g., according to a TG degradation rule, filter, ranking, algorithm, etc.

In embodiments, both VPMs and TSMs can be employed to measure the stability of one or more model corresponding to model data 505, 570, 571, etc., e.g., TFSDC 560 can monitor stability to allow system 500 to alert for feature-target instability over a period of time. TFSDC 560 analysis of one or more TSM 522 to 523, etc., can analyze TSMs across time in a plurality of competing models to enable selection of a preferred model. Values from TFSDC 560 can be used in heuristic, statistical, or machine learning algorithms to alert about certain features, e.g., features that need to be repaired/modified, have degraded and should be pruned, can be countered with a newly added feature, etc. Furthermore, data collected from system 500 can be used within a FAC, for example similar to or the same as FAC 130, 230, 330, etc., to further target certain features by mutating the production model, analysis of the permutations, and selection of a preferred updated model that can be implemented to replace a current production model suffering from temporal generalization effects. It can be appreciated by one of skill in the art that when deploying updates to an existing machine learning application, a best practice can be to test a new model, e.g., challenger model, against an existing/preferred model, e.g., a Champion model. This can include testing in a production environment, a development environment, etc. Once a challenger can be demonstrated to be performing better than a champion model, the challenger can be promoted to a new champion status, allowing for other challengers to compete with the new champion. This can be understood as running temporal feature stability detection on two or more models contemporaneously, where, instead of outputting feature-level target-feature stability scores, a model temporal stability score can be output, which can be regarded as an additional data point in deciding whether to promote the challenger, e.g., based on a measure of an expected temporal stability of the challenger model performance in comparison to the champion model performance.

System 500 can also comprise DASH 540 that can present champion result data 504, challenger result data 572 to 573, etc., which can correspond to model data 505, 570, 571, etc. DASH 540 can be the same as, or similar to, DASH 140, 240, 340, 440, etc., e.g., a dashboard enabling user interactions with system 500 that can include presenting a user with results from a FAC, feature scoring component results, feature manipulation component results, PAST improvement component results, TFSDC 560 results, TMC 520, fixed point component 524 calculations, over time component 526 calculations, MSC 510, VPM 512, champion model data 505, etc., can enable selection of permutation schema, can facilitate automated updating of models in development and/or production environments, can facilitate designation of a subsequent analysis, etc., among many dashboard-type interactions with a system described herein, e.g., system 100, 200, 300, 400, 500, . . . , etc.

Figure 6:
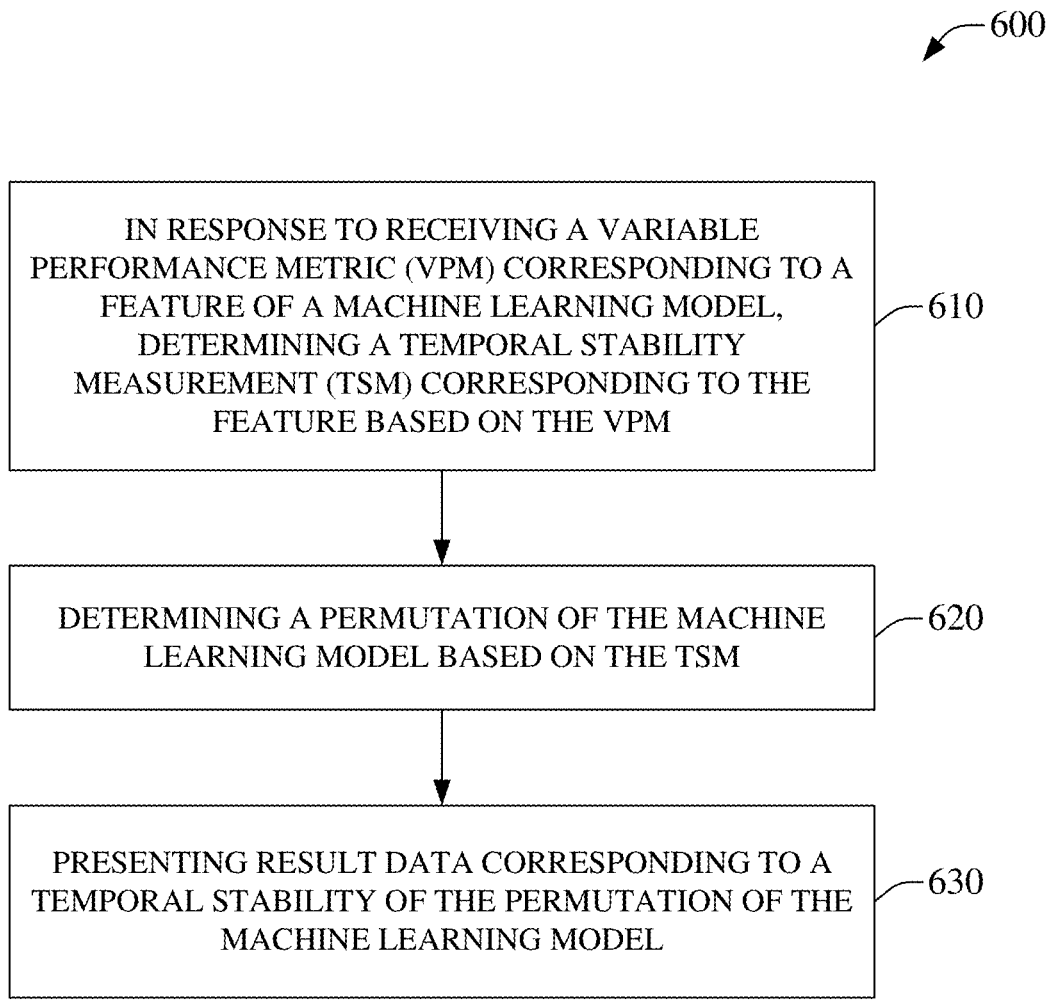
FIG. 6 is an illustration of an example method, enabling mitigation of temporal generalization effects corresponding to a machine learning model feature, in accordance with aspects of the subject disclosure.
Figure 7:
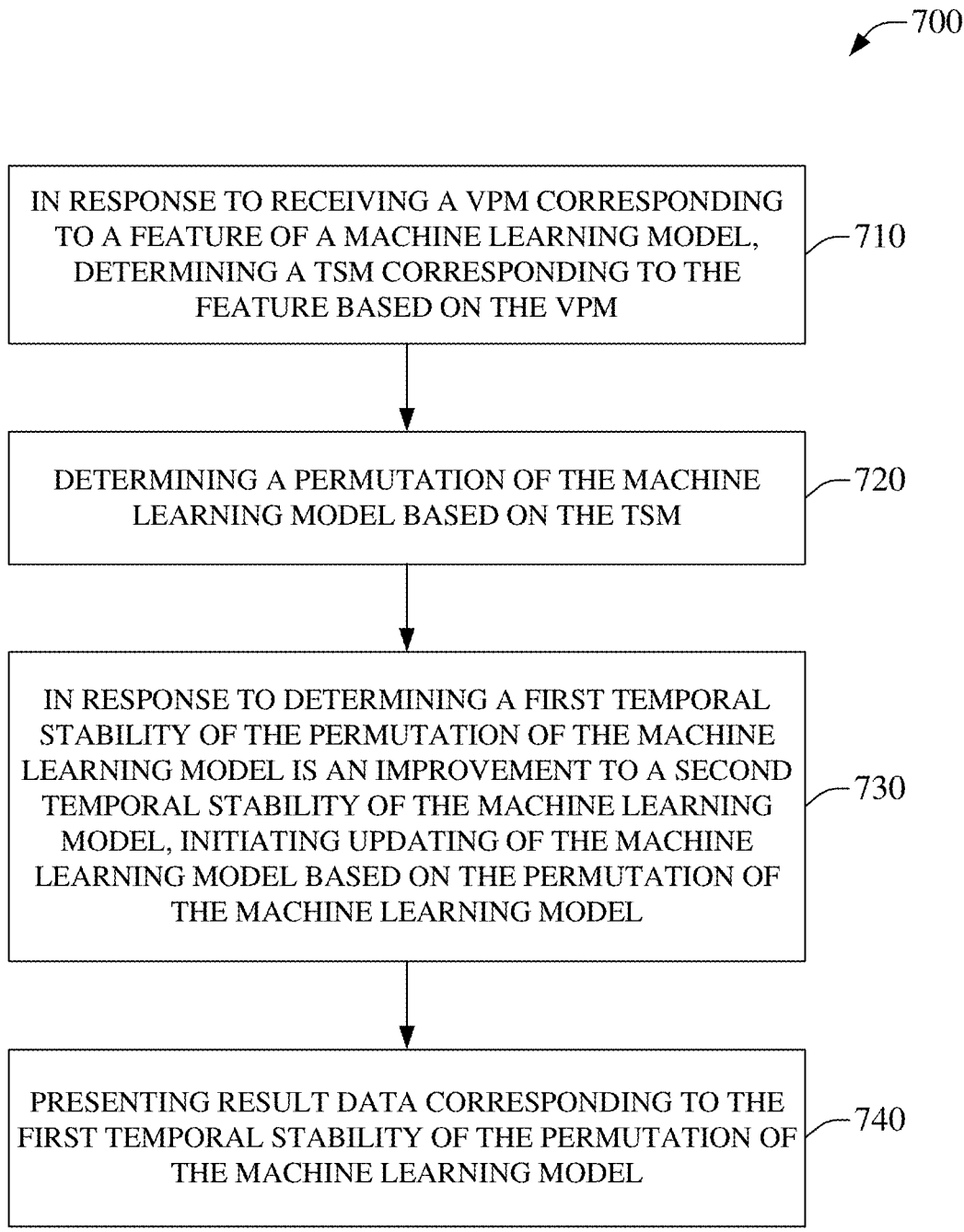
FIG. 7 illustrates an example method, facilitating mitigation of temporal generalization effects corresponding to a machine learning model feature via updating a of the machine learning model, in accordance with aspects of the subject disclosure.
Figure 8:
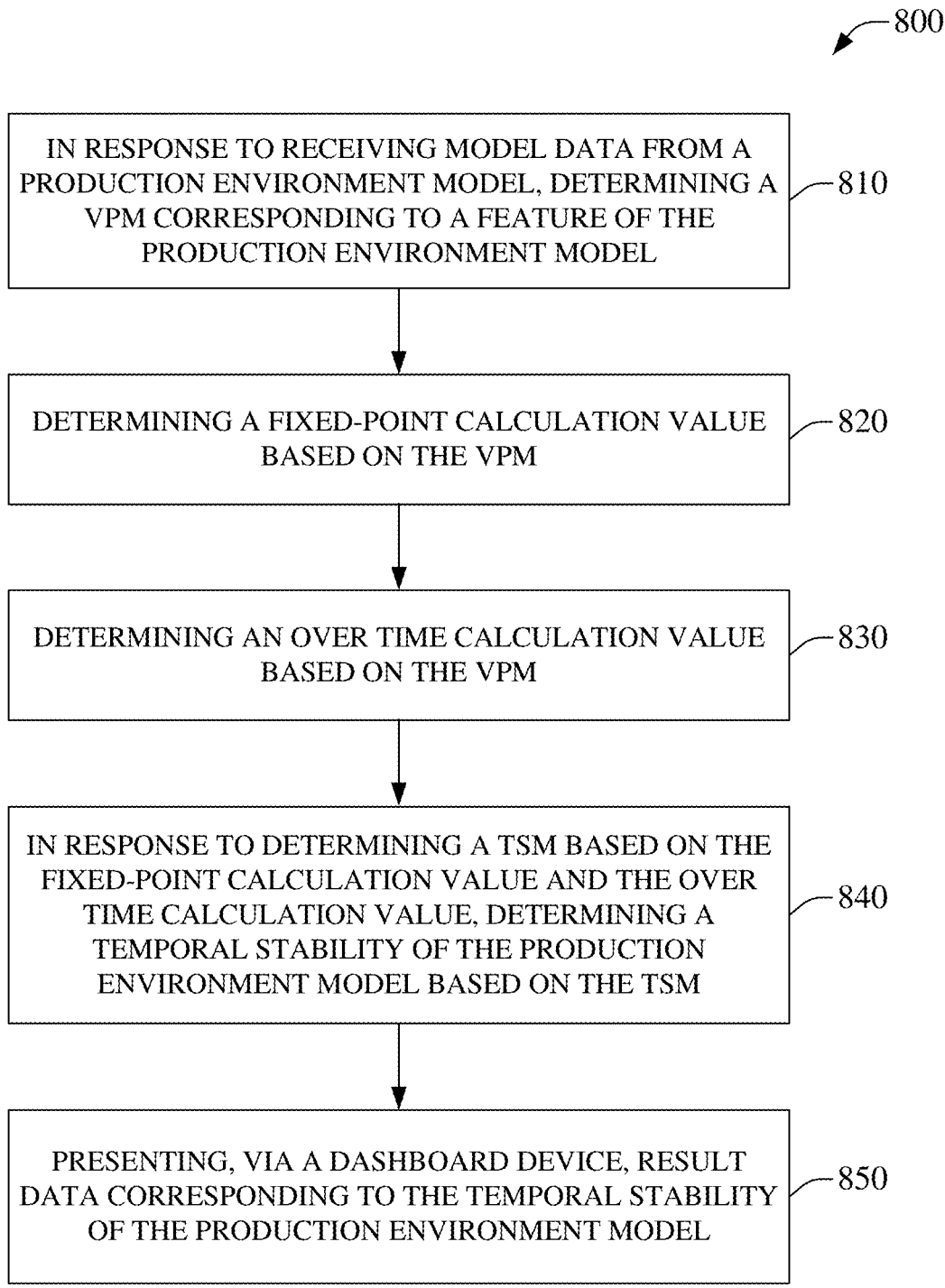
FIG. 8 illustrates an example method, enabling mitigation of temporal generalization effects corresponding to a machine learning model feature based on both fixed point and over-time calculations, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can facilitate mitigation of temporal generalization effects corresponding to a machine learning model feature, in accordance with aspects of the subject disclosure. At 610, method 600 can comprise determining a temporal stability measurement (TSM) corresponding to a feature of a machine learning model. In embodiments, the feature can be correlated to a variable performance metric (VPM). As such, the determining of the TSM can be in response to a receiving of the VPM based on, and corresponding to, a machine learning model feature, e.g., explanatory variables, etc. For different machine learning models, there can be different methodologies, correspondingly, to obtain VPM, for example, standardized coefficients for regression models, Gini based importance for random forests, etc. Therefore, a preferred set of VPMs can be selected based on variable interactions and importance of the variables to the inputted model and output the metric choices, the same as, or similar to, VPM selection indicated elsewhere herein.

At 620, method 600 can comprise determining a permutation of the machine learning model based on the TSM from 610. As noted elsewhere herein, a TSMs can consolidate VPMs through heuristic, statistical, machine learning, or other approaches, e.g., providing information relating to temporal stability of features over time in a possibly more digestible manner than VPMs. As an example, a feature of a model can become more and less significant in the performance of the model over several time windows, whereby there could be several VPMs indicating the increased or decreased value of the feature to the performance of the model corresponding to these several example periods, however, such as the feature overall becoming less significant to the predictive performance of the model despite a few periods of increased significance. Accordingly, in this example, the TSM can provide more VPM trend information that can be more efficient for use than relying on the VPMs directly. To this end, it can be said that utilization of multiple VPMs for both fixed-point as well as over-time data can allow a system to measure a stability of a feature-target relationship over time. Moreover, it can also be appreciated by one of skill in the art that there can be several types of calculations that can be completed to get to values corresponding to one or more model variables, features, etc., and that these values can be considered measurements of temporal stability, e.g., TSMs, as they can include a variety of stability indicators for a feature's impact on model performance across one or more periods of time.

As such, method 600, at 630, can comprise presenting result data corresponding to a temporal stability of the permutation of the machine learning model, e.g., based on one or more TSM from 620, etc. At this point, method 600 can end. In embodiments, result presentation can be via a dashboard, which for example, can comprise a visualization modality to represent to an end user values that can correspond to changes to a feature-target relationship over time. This can facilitate the end user initiating one or more action, e.g., triggering model updating, causing further analysis, flagging features of a model-under-test, etc. Moreover, in some embodiments, the result, while also being presentable, e.g., via a dashboard, etc., can also themselves be triggers causing a response, e.g., in an automated manner, etc. In some embodiments, features such as a heuristic value display, recommendations for dropping or altering features, etc., can be presented. Typically, a target metric(s) to TSM correlation can be presented, as well.

FIG. 7 illustrates example method 700 that facilitates mitigation of temporal generalization effects corresponding to a machine learning model feature via updating a of the machine learning model, in accordance with aspects of the subject disclosure. Method 700, at 710, can comprise, in response to receiving a VPM corresponding to a feature of a machine learning model, determining a TSM corresponding to the feature based on the VPM. This can be similar to, or the same as, disclosed in relation to 610 of method 600. As such, method 700 can comprise determining one or more TSMs based on one or more selected VPMs corresponding to one or more features of a machine learning model.

At 720, method 700 can comprise determining a permutation of the machine learning model based on the TSM. As is discussed elsewhere herein, a model can be mutated, whereby a permutation of the model can be similar to the model with constrained differences. This enables changes to a model feature to be correlated to changes in model performance. In embodiments, permutations can be iterative and/or exhaustive, e.g., sequential changes can be made in subsequent permutations that can support generating sufficient permutations to exhaustively test many, if not all, possible changes to one or more features of a model. As an example, if a model has two binary-state features, then four permutations can be generated so that all combinations of the two binary-state features can be tested. Similarly, in another example, if a model has sixteen binary-state features, then 65,536 permutations can be generated so that all combinations of the two binary-state features can be tested. In a further example, where a model has two nonbinary-state features, then 10,000 permutations can be generated so that 10,000 combinations of the two nonbinary-state features can be tested. In this example, it can be determined that variants is sufficient to characterize the temporal stability and performance of the model across the two nonbinary-state features, e.g., based on a selected rule related to determining an adequate count of permutations are needed to meet a business goal, etc. Accordingly, a permutation can be analyzed for temporal stability, and this analysis can indicate if the permutation has a different temporal stability and/or model performance than the machine learning model from 710. As an example, a TSM corresponding to a first feature of a machine learning model can indicate that a substantial decreased of temporal stability in regard to the feature-target relationship over time. In this example, a permutation of the model can be generated that removes the feature associated with decreased temporal stability. This example permutation can then be run to determine performance and temporal stability of the permutation, which can be compared, ranked against, etc., the performance and temporal stability of the unperturbed machine learning model. This example comparison can be illustrative of possible avenues of improvement for the unperturbed machine learning model.

Method 700, at 730, can comprise initiating, in response to determining a first temporal stability of the permutation of the machine learning model is an improvement to a second temporal stability of the machine learning model, updating of the machine learning model based on the permutation of the machine learning model. Returning to the preceding example, where the unperturbed model demonstrates performance and temporal stability that is favored over the result of the perturbed model, then the unperturbed model can be retained, for example retaining, as a champion model, the unperturbed model over the perturbed model as a challenger model. However, where instead the perturbed model demonstrates performance and temporal stability that is favored over the unperturbed model, then the unperturbed model can be replaced by the perturbed model, for example replacing a champion model with a challenger model.

Method 700, at 740, can comprise presenting result data corresponding to a temporal stability of the permutation of the machine learning model, e.g., based on one or more TSM from 710, etc. At this point, method 700 can end. Presenting results can occur where the machine learning model is being updated/replaced based on the permutation of the model, where the machine learning model is not being updated/replaces based on the permutation of the model, etc. In embodiments, result presentation can be via a dashboard, for example as recited at 630 of method 600, etc., which can facilitate an end user initiating one or more action, e.g., triggering model updating, causing further analysis, flagging features of a model-under-test, etc. Moreover, in some embodiments, the result, while also being presentable, e.g., via a dashboard, etc., can also themselves be triggers causing a response, e.g., in an automated manner, etc. In some embodiments, features such as a heuristic value display, recommendations for dropping or altering features, etc., can be presented. Typically, a target metric(s) to TSM correlation can be presented, as well.

FIG. 8 illustrates example method 800 facilitating mitigation of temporal generalization effects corresponding to a machine learning model feature based on both fixed point and over-time calculations, in accordance with aspects of the subject disclosure. At 810, method 800 can comprise determining, in response to receiving model data from a production environment model, a VPM corresponding to a feature of the production environment model. In embodiments, the feature can be correlated to a variable performance metric (VPM) for a deployed machine learning model, e.g., a model in a production environment as compared to a model in a development environment. As before, different methodologies can be used to determine a VPM, for example, standardized coefficients for regression models, Gini based importance for random forests, etc. As an example, SHAP is a known open-source library that explains model outputs using a combination of additive feature attribution and approximation methods, and a VPM(s) can be determined from values of SHAP variables/features for a model, e.g., SHAP values for one or more feature(s) over-time can be determined/selected. As another example, Gini importance can be calculated for each time window for a model trained over sliding time windows, and these variables can be selected as VPMs. The VPMs can therefore support determining of TSMs based on analysis of the VPMs over time, which can correspond to changes to a feature-target relationship over time.

At 820, method 800 can comprise determining a fixed-point calculation value based on the VPM. Similarly, at 830, method 800 can comprise determining an over-time calculation value based on the VPM. A fixed-point calculation can indicate model results based on a model feature(s), corresponding to a VPM(s), at a given fixed point in time. An over-time calculation can indicate model results based on a model feature(s), corresponding to a VPM(s), over a time window. As an example, a fixed-point calculation corresponding got a feature can determine a model output at a time T0 and T12, while an over-time calculation corresponding to the same feature can determine a model output change between T0 and T4, between T4 and T8, and between T8 and T12. This can enable determination relating to both the performance of the model, e.g., at T0 and T12, as well as to the temporal stability of the feature of the model, e.g., how the model performance changes in relation to changes in the feature over incremental time periods, e.g., T0-T4, T4-T8, T8-T12, etc., can be analyzed.

Method 800, at 840, can comprise, determining, in response to determining a TSM from the fixed-point calculation value at 820 and the over-time calculation value at 830, a temporal stability of the production environment model based on the TSM. The TSM can be based on the VPM, as has been discussed elsewhere herein. Also as noted elsewhere herein, a TSM can act as a consolidation of one or more VPMs through heuristic, statistical, machine learning, or other approaches, e.g., and can provide information relating to temporal stability of a feature(s) over time. It can generally be easier to understand the meaning of a TSM than to view the raw VPM values, e.g., a TSM can possibly be more digestible than the corresponding one or more VPMs contributing to the determined TSM. As such, utilization of multiple VPMs for both fixed-point as well as over-time data can allow a system to measure a stability of a feature-target relationship over time, and this temporal stability can be embodied in one or more corresponding TSMs that can reflect the temporal stability of a model over time.

At 850, method 800 can comprise presenting, via a dashboard device, result data corresponding to the temporal stability of the production environment model. At this point, method 800 can end. Embodiments of the dashboard can comprise, for example, a visual modality, an audio modality, a tactile modality, a haptic modality, etc., which can facilitate presenting information that can correspond to changes to a feature-target relationship over time for a machine learning model. This can facilitate initiating one or more action, for example by a component of a system illustrated in systems 100-500, etc., a device performing methods 600-800, etc., or other device, by an and user, etc., wherein the initiated action can cause effects, such as, model updating, further analysis, flagging features of a model-under-test, etc. In some embodiments, features such as a heuristic value display, recommendations for dropping or altering features, a target metric(s) to TSM correlation, etc., can be presented as additional information associated with a temporal stability of the model.

Figure 9:
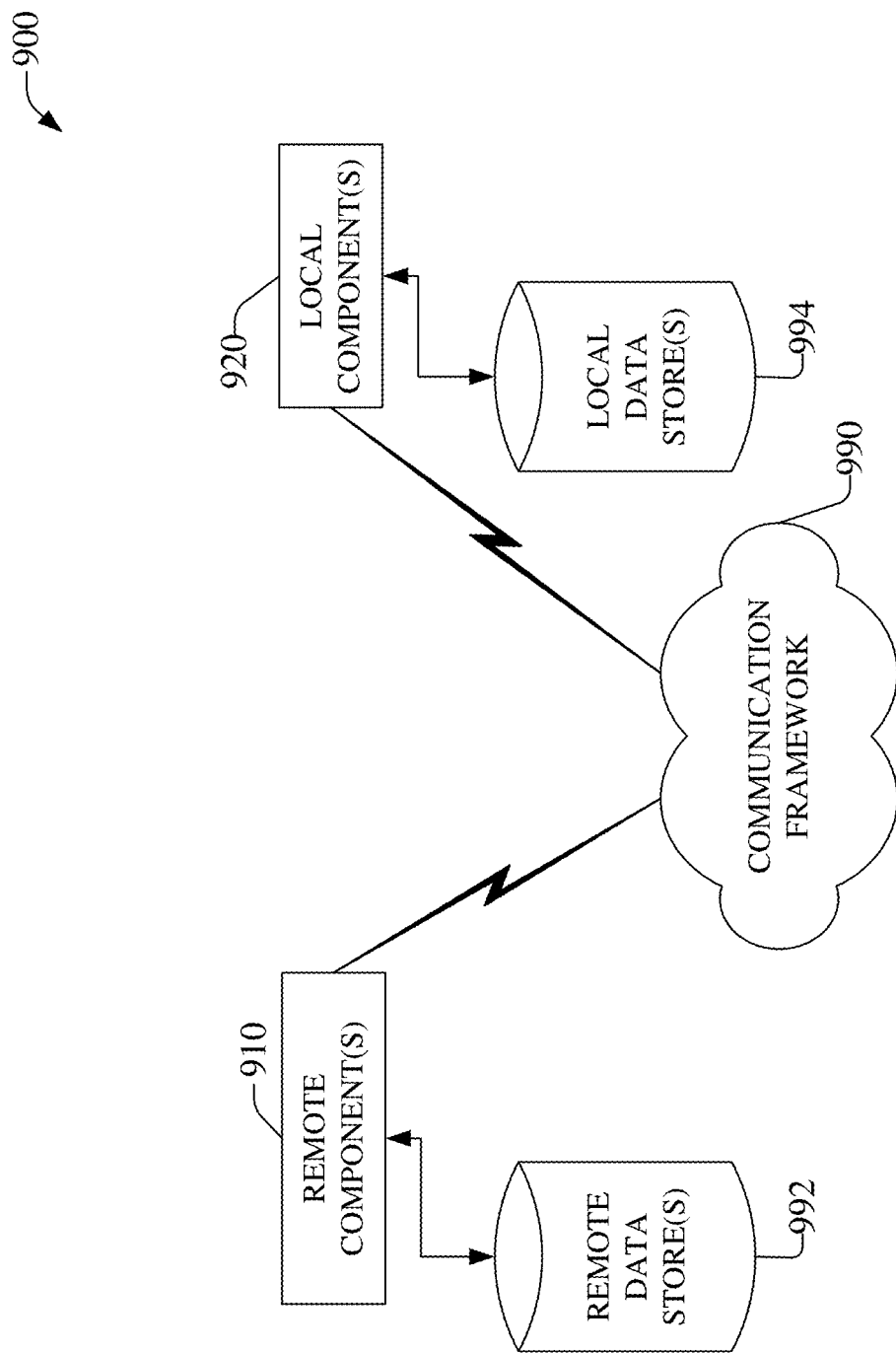
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise a source of model data 102-402, 505, 570-571, etc., a device comprising DASH 140-540, etc., MSC 110-510, etc., TMC 120-520, etc., FAC 130-330, etc., TFSDC 460-560, etc., or any other component that is located remotely from another component of systems 100-500, etc.

The system 900 also comprises one or more local component(s) 920. The local component(s) 920 can be hardware and/or software (e.g., threads, processes, computing devices). In some embodiments, local component(s) 920 can comprise a source of model data 102-402, 505, 570-571, etc., a device comprising DASH 140-540, etc., MSC 110-510, etc., TMC 120-520, etc., FAC 130-330, etc., TFSDC 460-560, etc., or any other component that is located local to another component of systems 100-500, etc. As one of many possible examples, a first system at a first location can generate model data 102 and select VPMs via MSC 110, which can be passed to a remotely located cloud-based virtual machine that can determine TSMs via a virtualized TMC 120, and determine temporal stability via a virtual FAC 230, which results can be passed over a wireless connection to DASH 140 executing on a mobile device at a second location that is remote from both the first location and the cloud-based virtual components.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 990 that can comprise path segments, path parts, etc., that can be employed to facilitate communications between the remote component(s) 910 and the local component(s) 920, and can comprise a fiber segment, metal segment, e.g., copper segment, etc., an air interface segment, e.g., Uu interface of a UMTS network, via a long-term evolution (LTE) network, and/or other path segment. Remote component(s) 910 can be operably connected to one or more remote data store(s) 992, such as a hard drive, solid state drive, SIM card, eSIM, device memory, etc., that can be employed to store information on the remote component(s) 910 side of communication framework 990. Similarly, local component(s) 920 can be operably connected to one or more local data store(s) 994, that can be employed to store information on the local component(s) 920 side of communication framework 990. As examples, model data, a VPM, a TSM, a result, etc., can be communicated between components of systems 100-500 via a communication framework, e.g., communication framework 990, etc.

Figure 10:
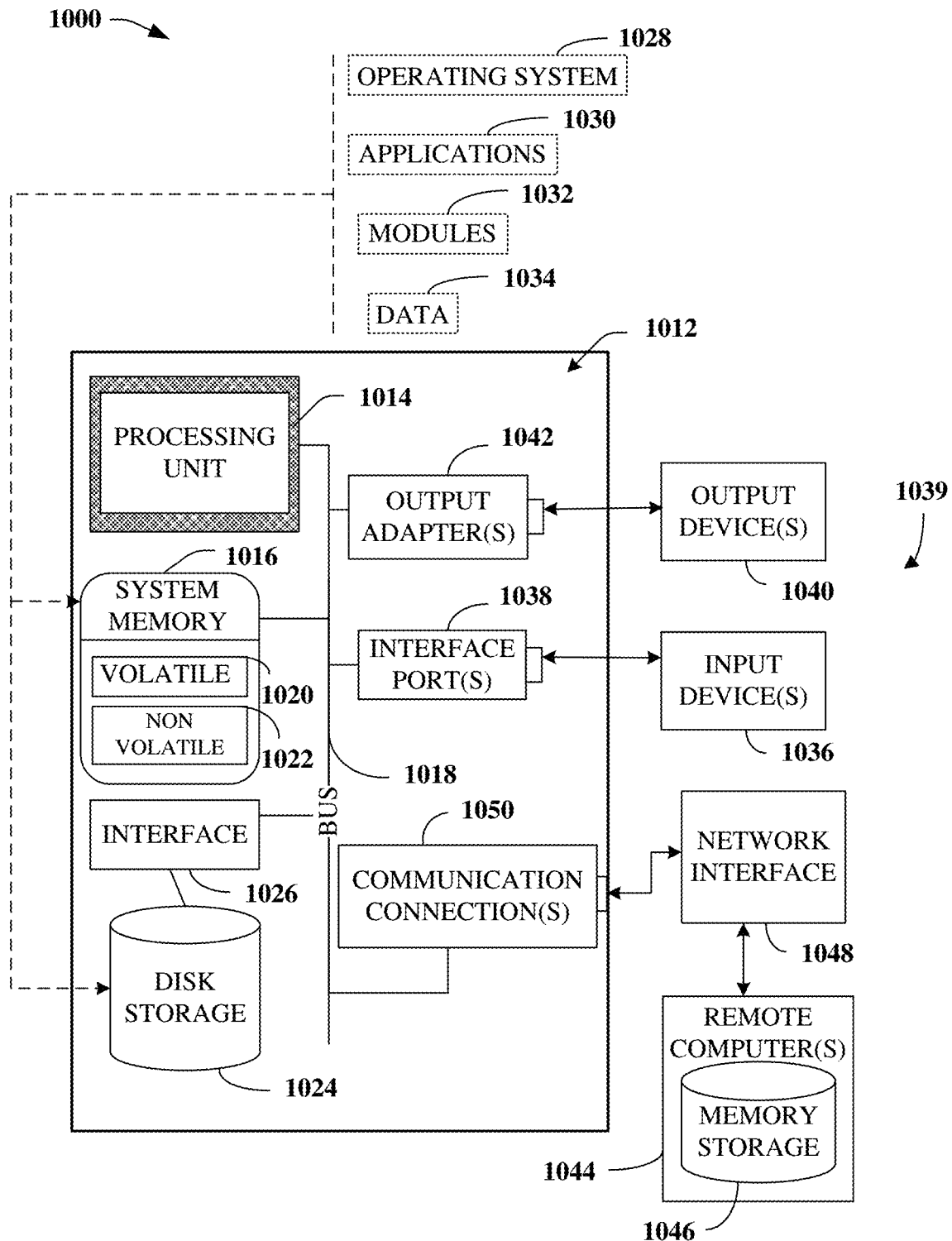
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random-access memory, synchronous dynamic random-access memory, double data rate synchronous dynamic random-access memory, enhanced synchronous dynamic random-access memory, SynchLink dynamic random-access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a source of model data 102-402, 505, 570-571, etc., a device comprising DASH 140-540, etc., MSC 110-510, etc., TMC 120-520, etc., FAC 130-330, etc., TFSDC 460-560, etc., or any other component of systems 100-500, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random-access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory, or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory, or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries, or other data retrieval protocols, for a variety of operations with respect to the information stored by the medium. As such, for example, a computer-readable medium can comprise executable instructions stored thereon that, in response to execution, can cause a system comprising a processor to perform operations comprising, selecting a group of variable performance metrics corresponding to features of a first trained model. The selecting employs a second trained model to preferentially indicate features of the first trained model that are predicted to have more influence on a performance of the first trained model. Further, determining a group of temporal stability measurements can be based on analysis of the first trained model relative to variable performance metric of the group of variable performance metrics. A feature-target relationship for the first trained model can be determined based on the group of temporal stability measurements. Additionally, a third trained model can be determined, based on the first trained model and a mutation selected from a group of mutations, wherein the mutation is selected based on a temporal stability measurement of the group of temporal stability measurements. Information about the feature-target relationship and the third trained model can be presented to an end user via a user interface.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface 1039, including the input device(s) 1036 and output devices 1040, can allow entry of user preference information, etc., and can be embodied in a touch sensitive display panel, a mouse/pointer input to a graphical user interface (GUI), a command line-controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring, and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); sixth generation partnership project (6G or 6GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer", or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices, and drawings such terms are intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor, facilitate performance of operations, comprising:
   determining, in response to receiving incoming model data for a model, a variable performance metric corresponding to a feature of the model affected by temporal generalization of the model;
   determining, based on a behavior of the variable performance metric as a function of time, a temporal stability measurement, the temporal stability measurement indicating an effect of the feature on the temporal generalization of the model over time;
   determining, based on the temporal stability measurement, a feature-target relationship for the model based on the feature, including generating a group of mutations of the model, respective mutations of the group of mutations modifying the feature based on the feature corresponding to an elevated temporal effect of the feature on temporal stability of the model, wherein the modifying comprises one of pruning the feature, replacing the feature with a new feature, weighting a feature value associated with the feature, or combinations of these, to identify a current model experiencing temporal generalization effects; and
   generating an indication of a preferred updated model that may replace the current model experiencing temporal generalization effects to mitigate the temporal generalization of the current model experiencing temporal generalization effects, wherein the preferred updated model comprises one mutation of the group of mutations of the model; and
   replacing the current model experiencing temporal generalization effects with the preferred updated model to reduce a likelihood of temporal generalization.

2. The device of claim 1, wherein enabling the access to the information about the feature-target relationship is via a dashboard-type user interface.

3. The device of claim 2, wherein the dashboard-type user interface employs a modality selected from a group of modalities comprising a visual modality, an audio modality, a haptic modality, and a tactile modality.

4. The device of claim 1, wherein the variable performance metric is selected in accord with a model performance metric selection rule.

5. The device of claim 4, wherein the model performance metric selection rule is employed to rank order model features comprising the feature, according to a level of influence each feature has on performance of the model.

6. The device of claim 1, wherein determining the temporal stability measurement comprises performing a fixed-point calculation for a feature corresponding to the variable performance metric and a time window calculation for the feature corresponding to the variable performance metric, wherein the fixed-point calculation is performed for a static time value, and wherein the time window calculation is performed for at least one time window.

7. The device of claim 6, wherein determining the temporal stability measurement is based on applying a process to results of the fixed-point calculation and the time window calculation, and wherein the process is selected from a group of processes comprising a heuristic process, a statistical process, and a machine learning process.

8. The device of claim 1, wherein determining the feature-target relationship for the model comprises indicating generation of a mutated model based on the model and comprising a mutation.

9. The device of claim 8, wherein the mutation is selected from the group of mutations comprising removing a feature from the model, modifying the feature of the model, and adding the feature to the model.

10. The device of claim 8, wherein the feature-target relationship for the model comprises a performance and temporal stability determined for, and correlated to, the mutated model.

11. The device of claim 8, wherein the model is a champion model, wherein the mutated model is a challenger model, and wherein the operations further comprise replacing the champion model with the challenger model in response to determining that the challenger model has a higher performance, as determined with reference to a defined performance criterion, and higher temporal stability, as determined with reference to a defined stability criterion, than the champion model.

12. The device of claim 1, wherein determining the feature-target relationship for the model comprises scoring features of the model, comprising the feature, based on temporal stability measurements, comprising the temporal stability measurement, according to a rule related to scoring according to a corresponding temporal stability of each of the features of the model.

13. The device of claim 1, wherein determining the feature-target relationship for the model comprises scoring features of the model, comprising the feature, based on temporal stability measurements, comprising the temporal stability measurement, according to a rule related to scoring, with regard to a selected business objective, according to a balance between a model performance change, as determined with reference to a defined performance criterion, and a temporal stability change, as determined with reference to a defined stability criterion, of the model.

14. A method, comprising:
selecting, by a processor of a system, a group of variable performance metrics corresponding to features of a first trained model, wherein the selecting employs a second trained model to indicate features of the first trained model that are predicted to have more influence on a performance of the first trained model;
determining, by the processor, a group of temporal stability measurements based on analysis of the first trained model relative to variable performance metric of the group of variable performance metrics, wherein the first trained model is affected by temporal generalization of the first trained model, the group of temporal stability measurements corresponding to effects of the features on the temporal generalization of the model over time;
determining, by the processor, a feature-target relationship for the first trained model for the features based on the group of temporal stability measurements, including generating mutations of the model, the mutations modifying the features based on the features corresponding to an elevated temporal effect of the features on temporal stability of the first trained model, wherein the modifying comprises one of pruning the features, replacing the features with new features, weighting a feature value associated with the features, or combinations thereof, to identify the first trained model as a current model experiencing temporal generalization; and
generating, by the processor, an indication of a preferred updated model, the preferred updated model automatically selected to replace the first trained model in order to mitigate the temporal generalization of the first trained model, wherein the preferred updated model comprises one mutation of the mutations, and
replacing, by the processor, the first trained model with the preferred updated model according to the indication to thereby mitigate the temporal generalization of the first trained model.

15. The method of claim 14, wherein determining the group of temporal stability measurements comprises evaluating the first trained model at a first time to determine a first group of values for the group of variable performance metrics at the first time, and evaluating the first trained model over a first time period to determine a first change in a second group of values for the group of variable performance metrics over the first time period.

16. The method of claim 14, wherein determining the feature-target relationship comprises determining a permutation of the first trained model, resulting in a third trained model, based on the group of temporal stability measurements.

17. The method of claim 16, wherein the first trained model is a champion model, wherein the third trained model is a challenger model, and wherein the challenger model replaces the champion model in response to determining, by the processor, that a challenger model value is preferable to a champion model value according to a rule based on a selectable business objective, wherein the champion model value is based on a first performance of the champion model and a first temporal stability of the champion model, and wherein the challenger model value is based on a second performance of the challenger model and a second temporal stability of the challenger model.

18. A non-transitory machine-readable storage medium, comprising executable instructions that, when executed by a processor, facilitate performance of operations, comprising:
selecting a group of variable performance metrics corresponding to features of a first trained model, wherein the selecting employs a second trained model to indicate features of the first trained model that are predicted to have a greater effect on a performance of the first trained model;
determining a group of temporal stability measurements based on analysis of the first trained model relative to variable performance metric of the group of variable performance metrics, wherein the first trained model is affected by temporal generalization of the first trained model, the group of temporal stability measurements corresponding to effects of the features on the temporal generalization of the model over time;
determining a feature-target relationship for the first trained model based on the group of temporal stability measurements, including generating a group of mutations of the first trained model, respective mutations of the group of mutations modifying the features based on the features corresponding to elevated temporal effect of the features on temporal stability of the model, wherein the modifying comprises one of pruning the feature, replacing the features with new features, weighting a feature value associated with the features, or combinations thereof, to identify the first trained model as a current model susceptible to temporal generalization;

determining a third trained model based on the first trained model and a mutation selected from the group of mutations, wherein the mutation is selected based on a temporal stability measurement of the group of temporal stability measurements to reduce a susceptibility to temporal generalization; and generating an indication of a preferred updated model, the preferred updated model selected automatically to replace the first trained model to mitigate the temporal generalization of the first trained model, wherein the preferred updated model comprises one mutation of the group of mutations, and replacing the first trained model with the preferred updated model according to the indication to thereby mitigate the temporal generalization of the first trained model.

19. The non-transitory machine-readable storage medium of claim 18, wherein the group of mutations comprise a mutation causing the third trained model to lack a feature of the first trained model, a mutation causing the third trained model to have a modified feature of the first trained model, and a mutation causing the third trained model to have an additional feature in comparison to the first trained model.

20. The non-transitory machine-readable storage medium of claim 18, wherein the first trained model is a champion model, wherein the third trained model is a challenger model, and wherein the challenger model replaces the champion model in response to determining, by the processor, that a challenger model value is preferable to a champion model value according to a rule based on a selectable business objective, wherein the champion model value is based on a first performance of the champion model and a first temporal stability of the champion model, and wherein the challenger model value is based on a second performance of the challenger model and a second temporal stability of the challenger model.

* * * * *